US010661516B2

(12) United States Patent
Manera et al.

(10) Patent No.: US 10,661,516 B2
(45) Date of Patent: May 26, 2020

(54) METHOD OF MAKING FRAME COMPONENTS FOR SPECTACLES AND A COMPONENT MADE BY THIS METHOD

(71) Applicant: SAFILO Società Azionaria Fabbrica Italiana Lavorazione Occhiali S.P.A., Pieve di Cadore (BL) (IT)

(72) Inventors: Giorgio Manera, Padua (IT); Nicola Belli, Padua (IT); Filippo Broccardo, Padua (IT)

(73) Assignee: SAFILO SOCIETÀ AZIONARIA FABRICA ITALIANA LAVORAZIONE OCCHIALI S.P.A., Pieve di Cadore (BL) (IT)

( * ) Notice: Subject to any disclaimer, the term of this patent is extended or adjusted under 35 U.S.C. 154(b) by 460 days.

(21) Appl. No.: 15/300,638

(22) PCT Filed: Apr. 7, 2015

(86) PCT No.: PCT/IB2015/052492
§ 371 (c)(1),
(2) Date: Sep. 29, 2016

(87) PCT Pub. No.: WO2015/155672
PCT Pub. Date: Oct. 15, 2015

(65) Prior Publication Data
US 2017/0106610 A1    Apr. 20, 2017

(30) Foreign Application Priority Data
Apr. 9, 2014 (IT) .............................. PD2014A0097

(51) Int. Cl.
B29D 12/02 (2006.01)
B29C 70/34 (2006.01)
(Continued)

(52) U.S. Cl.
CPC ............ B29D 12/02 (2013.01); B29C 43/021 (2013.01); B29C 43/20 (2013.01);
(Continued)

(58) Field of Classification Search
CPC ........ B29D 12/02; B29C 43/021; B29C 43/02
See application file for complete search history.

(56) References Cited

U.S. PATENT DOCUMENTS 3,744,888 A    7/1973    Bogyos

FOREIGN PATENT DOCUMENTS

FR         2637532 A1    4/1990
KR    20140039904 A     4/2014
(Continued)

*Primary Examiner* — Jacob T Minskey
*Assistant Examiner* — Melody Tsui
(74) *Attorney, Agent, or Firm* — Volpe and Koenig, P.C.

(57) ABSTRACT

A method is described for making frame components for spectacles, including: superimposing within a first mold, in the following order, at least a first film of plastic material, at least one semi-finished element pre-impregnated with resin, and at least a second film of plastic material; closing and heating the first mold, the temperature and pressure being applied and maintained until the resin is fully polymerized, in order to produce an intermediate component containing the semi-finished product); opening the first mold and extracting the intermediate component from the first mold. The method also includes: placing the intermediate component in a second mold; closing the second mold and forming a layer of polymer material on the intermediate component, resulting in mutual adhesion; opening the second mold and extracting an article produced by the molding step in the second mold and cutting the article to define the final profile of the component.

15 Claims, 2 Drawing Sheets

(51) Int. Cl.
*B29C 70/08* (2006.01)
*B29C 45/14* (2006.01)
*B29C 43/02* (2006.01)
*B29C 43/20* (2006.01)
*B29L 12/00* (2006.01)
*B29K 63/00* (2006.01)
*B29K 105/08* (2006.01)

(52) U.S. Cl.
CPC ...... *B29C 45/14786* (2013.01); *B29C 70/086* (2013.01); *B29C 70/345* (2013.01); *B29K 2063/00* (2013.01); *B29K 2105/0872* (2013.01); *B29L 2012/005* (2013.01)

(56) References Cited

FOREIGN PATENT DOCUMENTS

| | | | | |
|---|---|---|---|---|
| WO | 2009080444 A1 | 7/2009 | | |
| WO | 2010078687 A1 | 7/2010 | | |
| WO | WO-2010078687 A1 * | 7/2010 | ....... | B29C 45/14467 |
| WO | 2013156974 A1 | 10/2013 | | |
| WO | WO-2013156974 A1 * | 10/2013 | | |

* cited by examiner

METHOD OF MAKING FRAME COMPONENTS FOR SPECTACLES AND A COMPONENT MADE BY THIS METHOD

TECHNICAL FIELD

The present invention relates to a method for making frame components for spectacles, having the features described in the preamble to claim 1, which is the principal claim.

PRIOR ART

The invention also relates to a frame component for spectacles made by the aforesaid method.

In particular, the invention lies within the specific technical field of frames for spectacles made of plastic material, in which, according to the currently known technologies, the components of these frames, namely the frame front and/or the side bars, are produced by injection moulding, by cast moulding, or by mechanical machining.

In this field, the aim of the prior art has been to propose solutions intended to improve the ornamental effects and structural characteristics that can be obtained in components produced by moulding plastic material.

An example of a method designed for the aforesaid purposes is known from the international patent application WO2013/156974. This prior document proposes a method for making frame components which are characterized by the inherent decorative effects of textiles, and which are also structurally strong. According to this method, the frame component is made with a multi-layer or "sandwich" structure, in which the layers formed by individual textiles have a decorative function, while the various layers of glass or carbon fibre and the various layers of glass or carbon fibre textiles have the function of providing the desired strength and robustness in the component. This is because the necessary strength and robustness could not be achieved by using textile layers or sheets alone, regardless of their quantity.

One of the limits of this technology is due to the fact that the method for producing such a component is rather complicated and is characterized by rather long completion times, since a large number of materials have to be deposited in layers in a mould, in the form of layers of fibres and fibre textiles, in addition to the layers formed by the textile sheets.

Furthermore, it is evident that the aesthetic effects that can be obtained by this production method are also limited. This is because it is considered that, typically, glass or carbon fibres, and especially textiles made from these fibres, are only partially transparent to light, or not transparent at all. Consequently, if at least partially transparent decorative textile sheets (for example, textiles with bright colours and designs having less dense patterns or textures) are used, then in the component made by the method of WO2013/156974 the layers formed by fibres and fibre textiles, which are not intended to be visible elements, would in fact be partially visible through the decorative textile layers. Thus the fibres and fibre textiles would tend to nullify the desired aesthetic effect. To avoid the undesired effect of the fibres and fibre textiles visible through the decorative textile layers due to transparency, the choice of textiles is limited to the type of textile characterized by intense colouring and/or very dense textures or decorative patterns, such that the textile becomes practically non-transparent.

DESCRIPTION OF THE INVENTION

The main object of the invention is to provide a method for making frame components for spectacles, which is designed to overcome the limits identified with reference to the cited prior art.

In the context of this object, the invention proposes, in particular, to provide a method for making frame components in which the component contains a semi-finished element, such as a technical and/or decorative textile, in such a way as to obtain an ornamental effect with suitable characteristics of strength and structural robustness in the component, or, alternatively, in such a way as to differentiate the deformability of the frame component in one or more preferred directions in space.

Yet another object is that of providing a method for making frame components by fast and highly repeatable production cycles, in which the components are characterized by suitable strength and robustness.

These and other objects, which are made apparent below, are achieved by the invention by means of a method for making spectacle components devised in accordance with the appended claims.

BRIEF DESCRIPTION OF THE DRAWINGS

The features and advantages of the invention will be more apparent from the following detailed description of a preferred example of embodiment thereof, illustrated, for guidance and in a non-limiting way, with reference to the appended drawings, in which.

PREFERRED EMBODIMENT OF THE INVENTION

Figure 1:
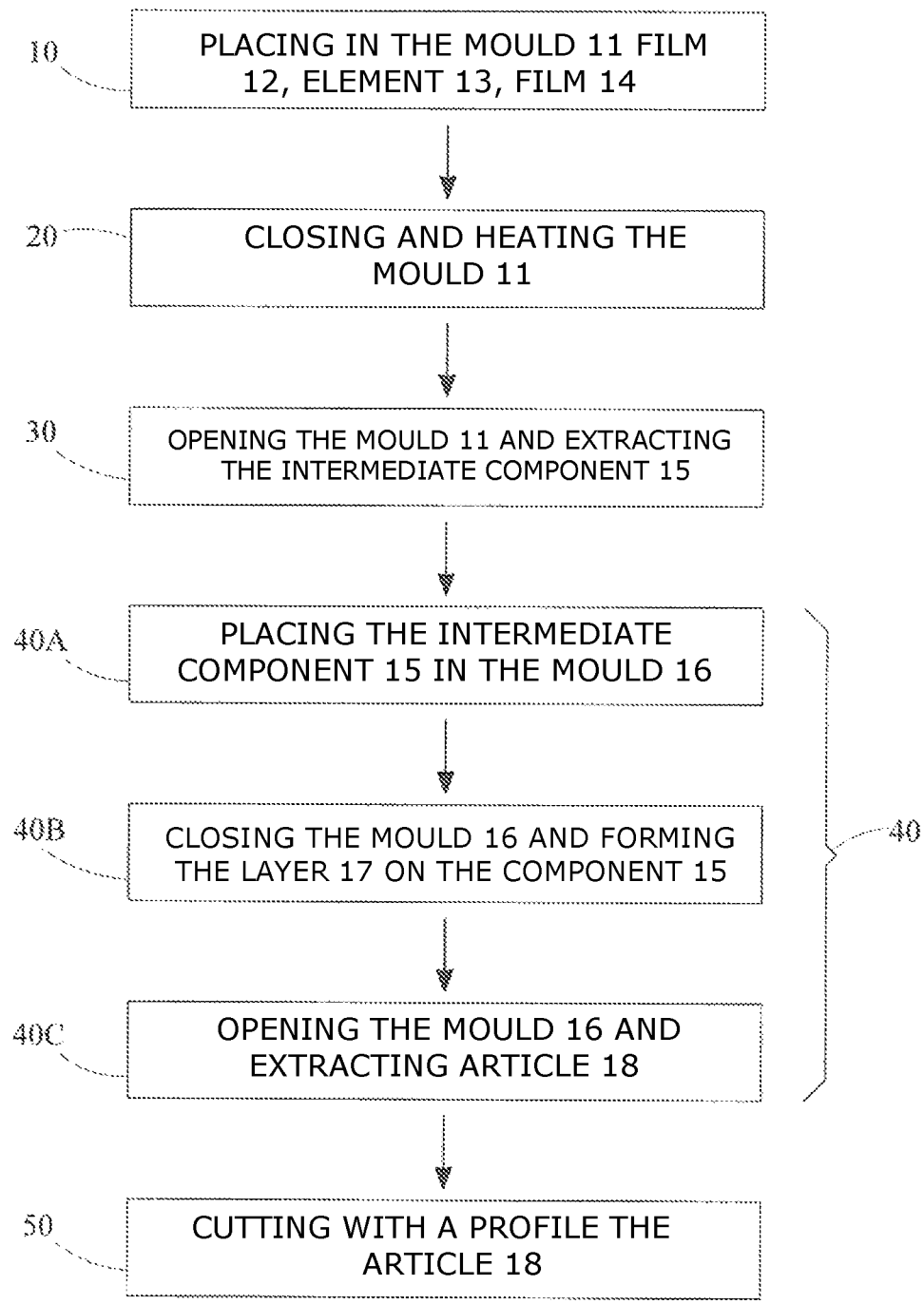
FIG. 1 is a flow diagram showing the main operating steps of the method of the invention.
Figure 2:
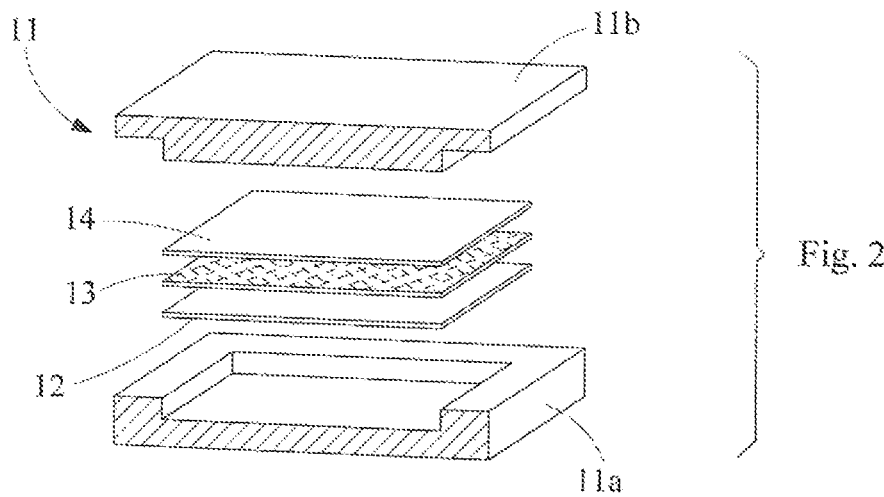
FIG. 2 is a schematic view in partial section of an operating step of the method of the invention.
Figure 3:
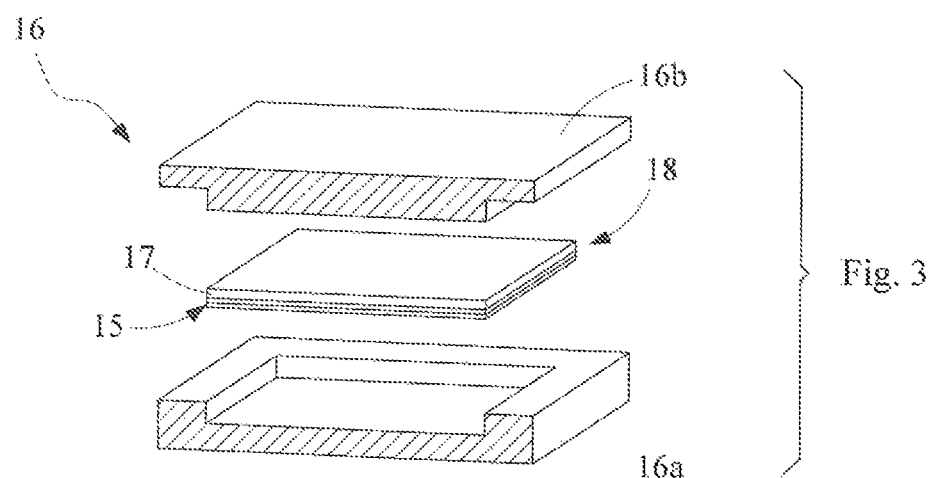
FIG. 3 is a schematic view in partial section of a separate operating step of the method of the invention.
Figure 4:
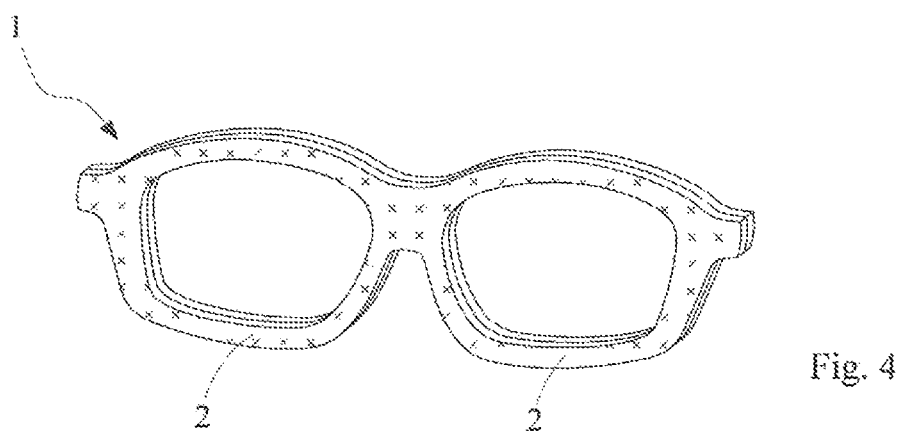
FIG. 4 is a schematic view of a frame component produced by the method of the invention.

With reference to the cited figures, the number 1 identifies a frame component for spectacles, in the form of a frame front having respective lens-holding rings 2, made by the method of the present invention. It is to be understood that the method is suitable for making other, different frame components as well as the frame front 1, for example the side bars connected in a pivoting manner to the frame front.

The method of the invention includes a first step 10 in which the following items are superimposed in a first 11, in the following sequence: a first film 12 of plastic material, a semi-finished element 13 pre-impregnated with resin, and a second film 14 of plastic material.

The mould 11 comprises a pair of half-moulds 11a, 11b, designed to close on to one another to complete the mould 11.

The first film 12, the semi-finished element 13 and the second film 14 are then placed sequentially, and in superimposition, on the surface of the half-mould 11a.

The semi-finished element 13 conveniently flat in shape, is very thin, and is preferably prepared in a rectangular shape. The chosen flat semi-finished element may have a different composition.

It may comprises fibres aggregated in an ordered way, being prepared, for example, in the form of a loom-woven textile, or a unidirectional textile, or a non-woven textile, or may alternatively comprise fibres aggregated in a disordered way.

As a further alternative, the semi-finished element may comprise single-layer and multiple-layer sheets or strips made of materials of natural origin, such as wood or cork.

The fibres of the element 13 may be of different kinds, may differ in their lengths, machining and finishing, and may or may not include substances providing a binding action or other possible effects such as sizing.

The flat semi-finished element 13 may also be prepared with or without decoration provided by graphic printing.

A subsequent step 20 provides for the closing and heating of the first mould 11, the moulding temperature and pressure being applied and maintained until the resin is fully polymerized, in order to produce an intermediate component, indicated by 15, containing the semi-finished product 13.

As regards the type of resin to be used in the method, that is to say the resin for impregnating the semi-finished element, it is possible to use polymer-based preparations of various kinds, characterized by different possible mechanisms for solidification, that is to say hardening. The resins may initially exhibit a variety of possible variants of physical state; that is to say, they are characterized by greater or lesser viscosity (liquids, pastes or gels).

The liquid phase, or in any case the non-solid phase of the resin, may result from the dissolution, suspension or dispersion of a solid in a solvent (an organic solvent or water), the solid or solids dissolved or suspended or dispersed in the solvent being composed of the molecules of a polymer.

Alternatively, the liquid, or in any case the non-solid, phase of the resin may result from the melting or softening of a solid, or may be formed by low molecular weight polymers (oligomers) which are still fluid.

The solidification or hardening of the resin, that is to say the change of the resin from the low-viscosity state (liquid, paste or gel) to the solid state may take place by simple evaporation of the solvent, or by the cooling of the melted product, or by chemical reaction of the oligomers which polymerize, that is to say form linear or reticular structures, with a high molecular weight.

The resins requiring a chemical reaction for their hardening may be of the single component or bi-component type. In the first case, all the substances forming part of the preparation constitute a single mixture, while in the second case the catalyst or hardener is kept separate from the other substances until the moment of use, when the components of the resin are mixed together before the impregnation of the initial semi-finished product.

By way of non-limiting example, a bi-component epoxy resin may conveniently be used in the method described.

Step 20 is followed by step 30, in which the mould 11 is opened and the intermediate component 15 is extracted from the mould.

If the flat semi-finished element 13 is formed by a decorative textile, after steps 10-30 the textile is incorporated in a polymer matrix, imparting greater density and dimensional stability to the textile, but retaining a significant degree of flexibility or elastic deformability, owing to the reduced overall thickness.

The films 12, 14 of plastic material used in step 10 also contribute to the increased density and dimensional stability. These films may be transparent or non-transparent. They may also be characterized by specific physical properties such as the capacity to polarize visible radiation (acting, therefore, as polarizing filters), or to absorb or reflect selectively determined frequencies of visible or non-visible radiation (for example, by absorbing UV radiation and therefore acting as a screen against this radiation).

The increased density and dimensional stability acquired by the intermediate component 15 are useful in a further subsequent step, indicated as a whole by 40, in which a second mould 16 is used for forming an additional layer of polymer material on the intermediate component 15.

The numbers 16a and 16b identify the respective half-moulds, designed to close on to one another to complete the mould 16.

Additionally, the films 12 and 14 of plastic material which cover the textile form physical or mechanical protection for the textile, which is helpful for safeguarding the textile from possible damage or modifications caused by the forming process executed in step 40.

According to a variant of the set of steps 10-30 described above, layers of the same resin as that with which the element 13 was pre-impregnated may be interposed between the flat semi-finished element 13 and the films 12 and 14 of plastic material.

In step 40, the positioning of the intermediate component 15 in the mould 16 is more precise, stable and therefore repeatable than the positioning of a single offcut or piece of untreated textile, which by its nature would tend to be shifted, folded or wrinkled within the mould by the least random or unintentional stress, during the operations of preparing for the formation of the additional layer, or even during the forming process itself.

Step 40 comprises, in turn, three sub-steps executed one after the other, indicated respectively by 40A, 40B and 40C.

In step 40A, the intermediate component 15 is placed in the second mould 16. In the next step, 40B, the second mould 16 is closed and a layer 17 of polymer material is formed on the intermediate component 15, resulting in mutual adhesion.

In the next step, 40C, the second mould 16 is opened, and an article that has been produced by the moulding step in the mould 16, identified by the reference 18, is extracted.

When the article 18 has been extracted from the mould 16, the method provides for the execution of a step 50 of cutting the article 18 so as to define the final profile of the frame component 1.

The purpose of step 40 is to increase significantly the thickness of the initial component 15 containing the textile 13, and consequently to produce a frame component 1 characterized by sufficient strength, robustness and dimensional stability. In particular, the thickness of the layer 17 of polymer material fixed to the intermediate component 15 may, if one of the polymer materials conventionally known and used in the relevant field is used, be such as to equal, in the final component 1, the mean thickness or the typical thickness of spectacle frames commonly made, for example, by the injection moulding of polyamide, or by the casting of thermosetting epoxy resins, or by using numerically controlled machines to cut semi-manufactured products made from cellulose acetate sheets, or by other methods.

Otherwise, if use is made of a polymer material having better mechanical characteristics than those typical of polymer materials conventionally known and used in the relevant field, the thickness of the layer 17 of polymer material fixed to the intermediate component 15 may be such that the thickness of the final component 1 may be substantially smaller than the mean thickness or the typical thickness of spectacle frames commonly made, for example, by the injection moulding of polyamide, or by the casting of thermosetting epoxy resins, or by using numerically controlled machines to cut semi-manufactured products made from cellulose acetate sheets, or by other methods.

Conveniently, the layer 17 of polymer material may be applied to the intermediate component 15 in step 40 by using the injection moulding method, in which the intermediate component 15 is placed in the mould 16, made in the form of an injection mould, the component being laid on the surface of one of the two half-moulds 16a, 16b, and a molten plastic material is then injected into the mould 16 so that it fills the mould cavity and, on solidifying, adheres to the free side of the intermediate component 15, becoming fixed to it.

Alternatively, the layer 17 of plastic material may be applied to the intermediate component by using the cast moulding method, in which the intermediate component 15 is placed in the mould 16, made in the form of a mould for cast moulding, the component being laid on the surface of one of the two half-moulds 16a, 16b, and the liquid resin is then poured or sucked into the mould so that it fills the mould cavity and, on solidifying, adheres to the free side of the intermediate component 15, becoming fixed to it.

A further example of a method that can be used in step 40 is what is known as compression moulding, relating to the forming of articles from rubber or elastomer. Compression moulding generally consists in positioning the rubber, prepared in the form of a semi-manufactured product of suitable shape and weight, in the heated and open mould 16 (made in the form of a mould suitable for compression moulding), and then closing the mould under pressure for a sufficient time for the polymerization or vulcanization, that is to say the cross-linking of the rubber, in its new and final shape. In the case of the method proposed herein, if a layer of rubber or elastomeric material is to be fixed to the intermediate component 15, in step 40 both the intermediate component and the pre-formed semi-manufactured product made of rubber or elastomer are placed in the forming mould. The mould is then closed, with the application of pressure, after which, according to the heat applied, the rubber preform will be polymerized or cross-liked, assuming the shape of the mould, while also adhering to the intermediate component 15.

In step 40, certain components useful for the final assembly of the frame may also be placed in the mould if appropriate. For example, if a frame front is being produced, the two hinges for the pivoting of the right and left side bars respectively may be placed in the mould together with the intermediate component in sub-step 40A, so that the two hinges are incorporated in the layer of plastic material during the injection, casting, or compression.

Consequently, the article 18 produced in the forming step and extracted from the mould in step 40C already has the hinges present for the pivoting of the side bars, which are subsequently assembled on to the frame front after step 50 in which the article is cut to a profile.

Another example, again relating to the production of a frame front, is that of the placing of components useful for the fixing of structures intended for support on the nose, generally formed by what are known as nosepieces or nose pads. In this case, the components may consist of typical metal wires, but are not restricted to these.

Thus the invention achieves the proposed objects while yielding numerous advantages by comparison with the known solutions.

A first advantage relates to the use, in the method of the invention, of a flat semi-finished element, which makes it possible to obtain the particular aesthetic effect characteristic of the textiles or sheets of natural materials which make up the element.

A second advantage lies in the fact that the flexibility or the plastic or elastic deformability of the frame component may be modified. This will be evident if it is noted that, in the assembly formed by the final component, the semi-finished element is equivalent to the "outermost fibre" of the cross section of the component, or to the "innermost fibre", depending on the position of the semi-finished element in the component, and on the stress considered over the cross section of the component.

If the frame component intended to form a frame front has been produced in such a way that the flat semi-finished element composed of high-strength fibre or textile is positioned on the rear side of the frame front, that is to say on the side nearer the user's face, then in the case of a bending or deforming stress tending to "open" the frame front (in the sense of increasing its curvature), the textile is equivalent to the outermost "fibre" in the cross section of the component. Under this stress, the outer fibre is the fibre of the material of the cross section that is subjected solely to tension, while the inner fibres are subjected solely to compression.

Assuming also that use is made of a technical textile for example, or a particularly strong class of fibres, so that the flat semi-finished element is characterized by better mechanical properties than those of the plastic material chosen for the formation of the additional layer, it is found that the "outermost fibre" of the frame front has a greater resistance to elongation than that offered by a corresponding "fibre" or strip of the plastic material forming the frame front as a whole, and the result is increased overall resistance of the frame front to "opening" deformation.

It should be noted that, in this example, the increased resistance of the component to deformation is not symmetrical; that is to say it is obtained solely for the opening of the frame front, and not for the opposite deformation, in the direction of "closing". This is because the tensile strength in the technical textile may be much greater than the compressive strength, whereas for a "fibre" or strip of plastic material both the tensile strength and the compressive strength tend to be equal.

By choosing the most suitable type of fibres or textiles, therefore, the flexibility or deformability of the frame component can be differentiated in a preferred direction. This may result in increased dimensional stability of the component or of the frame in a preferred direction, which in turn may yield considerable benefits for the user and possibly for the manufacturer as well. It is advantageous for the user, given that an increase in the curvature of a frame front made of plastic, due to post-moulding deformation for example, is detrimental to the security or stability of the fit, and, rather than an increase, a reduction in the curvature is preferable. It is advantageous for the manufacturer in specific machining operations such as those required in the final step of cutting the article to a profile, where the component has to bear on a more or less flat support with its curvature facing upwards, if the component is not easily subject to "crushing" or deformation by "opening", which could lead to errors in machining.

The methods of the known solutions, such as that specified in WO2013/156974, do not enable the deformability of the component to be differentiated in a preferred direction, since the structure of the component provided by these methods consists of successive layers of fibres and textiles which are symmetrical with respect to the "neutral fibre" or central axis of the cross section of the component. Consequently there is no "outermost fibre" having different mechanical properties from an "innermost fibre", and therefore the mechanical behaviour of the component is equal in both possible directions of stress.

It should be noted that, in order to obtain the aesthetic effect of a variously coloured and/or decorated textile, according to the method of the invention described above the resin and the films of plastic material used in steps 10-30 for the purpose of forming the intermediate component should be at least partially transparent. In this condition, the textile will be visible through the films and resin in which it is incorporated.

Additionally, injection moulding, cast moulding and compression moulding are all inherently characterized by high repeatability, precision of working and speed of execution. These methods are therefore very suitable for the purpose of reinforcing the intermediate component containing a textile by increasing the thickness, because they use a process having a short, low-cost production cycle. The method of the present invention therefore differs from the aforementioned known method in which an intermediate component or a semi-finished element containing a textile is reinforced by the application of superimposed layers of fibres and textiles of glass or carbon fibre, this known method resulting in greater complexity, with longer production cycles and higher costs, while also being more subject to possible errors of execution. Since the frame components for spectacles must be characterized by specific curvatures which play a functional role in determining the correct fit of the frame on the user's face, the article produced in step 40 of the method of the invention will have the curvature specified in the design for the component which it is to form, and consequently the mould cavity for injection or cast moulding must be made more or less curved, replicating, for example, the curvature specified for the frame front, or the curvature specified for the side bar of the frame.

In step 50, the component produced in step 40 is cut according to the shape and dimensions specified by the design of the spectacle frame. The cutting operation then produces the external shape or profile of the frame component, while other machining operations with removal of material are also carried out where necessary. For example, if the frame component acts as a frame front, the holes passing through the component for receiving the spectacle lenses may be formed in the same step 50. In the same step 50, the channels inside the lens holders for retaining the lenses may be formed; or alternatively the bevels, that is to say the ridged or raised inner edges for retaining lenses having perimetric grooves, may be produced.

The cutting operations, and the machining specified in step 50 in general, may be carried out by applying known methods, for example by using numerically controlled machines or pantograph machines for cutting plastic materials.

The invention claimed is:

1. A method of making frame components for spectacles, the method comprising the following steps:
    superimposing within a first planar mold (11), in the following order, at least a first film (12) of plastic material, at least one semi-finished element (13) pre-impregnated with resin, and at least a second film (14) of plastic material, the semi-finished element (13) being a textile having flat shape,
    closing and heating the first planar mold (11), the molding temperature and pressure being applied and maintained until the resin is fully polymerized, in order to produce an intermediate component (15) containing the semi-finished product (13), said intermediate component (15) having a reduced overall thickness and comprising opposed main surfaces,
    opening the first planar mold (11) and extracting the intermediate component (15) from the first planar mold (11),
    placing the intermediate component (15) in a second planar mold (16),
    closing the second planar mold (16) and forming a layer (17) of polymer material on the intermediate component (15), resulting in mutual adhesion, the layer (17) of polymer material being applied to one of the opposed main surfaces of the intermediate component (15) during the step of molding in the second planar mold (16), to increase significantly the thickness of the intermediate component (15) and consequently to obtain in the frame component sufficient strength, robustness and dimensional stability,
    opening the second planar mold (16) and extracting a flat article (18) that has been produced by the molding step in the second planar mold (16),
    cutting the flat article (18) so as to define the final profile of the frame component.

2. The method according to claim 1, wherein the semi-finished element (13) has a thin shape.

3. The method according to claim 1, wherein the semi-finished element (13) has a rectangular shape.

4. The method according to claim 1, wherein the semi-finished element (13) comprises fibers aggregated in an ordered way.

5. The method according to claim 4, wherein the semi-finished element (13) is a non-woven textile.

6. The method according to claim 1, wherein the semi-finished element (13) comprises fibers aggregated in a disordered way.

7. The method according to claim 1, wherein the semi-finished element (13) comprises single-layer and multiple-layer sheets or strips made of natural materials.

8. The method according to claim 1, wherein the semi-finished element (13) comprises a decoration created by graphic printing.

9. The method according to claim 1, wherein the intermediate component (15) produced by molding in the first mold (11) has a sheet-like shape.

10. The method according to claim 1, wherein the molding of the layer (17) of polymer material on to the intermediate component is carried out by injection molding in the second planar mold (16).

11. The method according to claim 10, wherein the injection molding comprises the following steps:
    placing the intermediate component (15) in the second planar mold (16) so as to bear on a surface of one of the two half-mold (16a, 16b) that make up the second planar mold (16),
    injecting the molten polymer material into the second planar mold (16) so that the polymer material fills the cavity of the second mold and, on solidifying, adheres to a free surface of the intermediate component (15), opposite the surface bearing on the half-mold, and thus becomes fixed to the intermediate component (15).

12. The method according to claim 1, wherein the molding of the layer (17) of polymer material on to the intermediate component (15) is carried out by cast molding in the second planar mold (16).

13. The method according to claim 12, wherein the cast molding comprises the following steps:

placing the intermediate component (15) in the second planar mold (16) so as to bear on a surface of one of the two half-molds (16a, 16b) that make up the second planar mold (16), pouring or sucking the liquid polymer material into the second planar mold (16) so that the polymer material fills the cavity of the second planar mold and, on solidifying, adheres to the free surface of the intermediate component (15), opposite the surface bearing on the half-mold, and thus becomes fixed to the intermediate component (15).

14. The method according to claim 1, wherein the molding of the layer (17) of polymer material on to the intermediate component (15) is carried out by compression molding.

15. The method according to claim 14, wherein the compression molding comprises the following steps:

placing the intermediate component (15) and a semi-finished rubber or pre-formed elastomer product in the second planar mold (16), closing the second planar mold (16) and applying suitable pressure and heat to cause the cross-linking of the semi-finished rubber or pre-formed elastomer product, so that it assumes the shape of the mold and adheres to the intermediate component (15).

* * * * *